United States Patent [19]

Kamada

[11] Patent Number: 5,202,904
[45] Date of Patent: Apr. 13, 1993

[54] PULSE STUFFING APPARATUS AND METHOD

[75] Inventor: Yoshiki Kamada, Tokyo, Japan

[73] Assignee: NEC Corporation, Tokyo, Japan

[21] Appl. No.: 851,836

[22] Filed: Mar. 16, 1992

[30] Foreign Application Priority Data

Mar. 14, 1991 [JP] Japan .................................. 3-075648

[51] Int. Cl.$^5$ .............................................. H04L 7/00
[52] U.S. Cl. .................................... 375/118; 370/102; 370/108
[58] Field of Search ........................ 375/106, 114, 118; 370/84, 100.1, 102, 105.1, 105.3, 94.1, 108

[56] References Cited

U.S. PATENT DOCUMENTS

| | | | |
|---|---|---|---|
| 4,764,942 | 8/1988 | Shigaki | 375/118 |
| 4,928,275 | 5/1990 | Moore et al. | 375/118 |
| 4,965,794 | 10/1990 | Smith | 370/105.1 |
| 5,077,761 | 12/1991 | Tokunaga | 370/108 |

Primary Examiner—Stephen Chin
Attorney, Agent, or Firm—Sughrue, Mion, Zinn, Macpeak & Seas

[57] ABSTRACT

A pulse stuffing multiplexer apparatus is used in order to carry out multiplexing of these signals. The low order data signal for a single channel is stored into an m-bit memory in accordance with a clock signal obtained by demultiplying the low order clock signal of that channel to 1/m to be read out as the high order data signal by a clock signal obtained by demultiplying a common high order clock signal not lower than all the low order clock signals to 1/m. When the high order data signal is read out from this memory, an S-th ($S \leq m$) of both clock signals is monitored and, when the phase difference therebetween falls within predetermined k-bits ($k \leq m$), both demultipliers are reset at the head position of the next frame for both clock signals to be initialized at a predetermined position. In addition, the numbers of the low order clock and the high order clock are counted for each frame and, when the difference therebetween exceeds one bit, the high order clock signal is suppressed at the trailing end of the frame. If the above processing is made to all the channels, then each channel may be inserted at the corresponding position with an appropriate number of stuffing bits for synchronization so that it becomes possible to readily achieve a multiplexed signal by utilizing a multiplexer.

7 Claims, 3 Drawing Sheets

PULSE STUFFING APPARATUS AND METHOD

BACKGROUND OF THE INVENTION

1. Field of the Invention

The present invention relates to a digital data multiplex communication system, particularly to a pulse stuffing multiplex communication system utilizing a stuffing technique.

2. Description of the Prior Art

Conventionally, multiplexing of digital signals has been carried out by a time-division multiplex system. If the signals to be multiplexed are asynchronous digital signals, then a pulse stuffing multiplex technique has been utilized.

Generally, according to this type of multiplex communication system, the positional relationship between a writing clock and a reading clock for the memory is monitored for each interval of m clock bits at the transmitting side to insert stuffing bits as the phase difference between both clocks is reduced to within predetermined j-bits ($j \leq m$).

FIG. 1 is a view illustrating an example of an arrangement of a pulse stuffing circuit for a single channel for the above prior art. Here, for the sake of clarifying the description, a case in which a single channel signal of low order data signals is synchronized with a high order frequency is referred to. Low order data signal Ii is entered to m-bit memory circuit 5 from terminal 1 to be stored therein by using a writing clock signal obtained from 1/m frequency divider 6 which divides low order clock signal CLi entered from terminal 2. This data is read out from m-bit memory circuit 5 by using a clock signal obtained by 1/m frequency divider 7 which divides clock signal $CL_H$ entered in it. The data is emitted from terminal 4 as high order data signal Hi. By monitoring the phase difference between the S-th ($s \leq m$) divides outputs of each of frequency divides 6 and 7, phase comparator 8, when the difference is reduced to within the predetermined j-bits, emits clock control signal 10. While clock control signal 10 is being entered, clock signal control circuit 9 suppresses the clock at the higher order side. FIG. 2 is an example of a timing chart illustrating the relationship between the signals when $m=8$ and $S=8$. In other words, each bit Ai of low order data signal Ii is sequentially written into eight-bit memory circuit 5 by the clock from divider 6, which divides low order clock signal CLi to $\frac{1}{8}$. On the other hand, high order data signal bit Ai is sequentially read out from eight-bit memory circuit 5 by the clock emitted from frequency divider 7, which divides high order clock signal $CL_H$. When, by monitoring the phase difference between the low and high order data signals, it is found that the phase difference has been reduced within a predetermined interval, phase comparator 8 emits clock control signal 10, and high order clock signal $CL_H$ is suppressed. Accordingly, while clock control signal 10 is being emitted, reading of high order data signal Hi is stopped and a corresponding number of stuffing bits is inserted into this vacant data position by a multiplexer circuit (not shown) in the subsequent process. For all other channels, a similar operation is conducted as well, and these high order data signals synchronized for all channels are multiplexed at the multiplexer circuit to be fed out.

In the above conventional embodiment, as the difference between the low order frequency and the high order frequency becomes greater, the operating range of the phase difference between the writing and reading clock signals greatly fluctuates. Then, if the phase difference is sampled and monitored at the memory bit cycle, the number of sampling cycles repeated in a single frame of the high order data cannot be an integer. Therefore, the minimum phase difference between the writing clock and the reading clock signals cannot be detected, with the result that the reading clock signal overtakes the writing clock signal. Then, if all the bits are to be monitored, the size of the pulse stuffing circuit becomes large and complicated, thereby increasing the power consumption.

SUMMARY OF THE INVENTION

In view of the above drawbacks inherent to the conventional technique, an object of the present invention is to provide a pulse stuffing apparatus and method which allow a minimum phase difference between the writing and reading clock signals to be detected even if the difference between the low order frequency and the high order frequency becomes great, and thereby prevent the passing between clocks at the writing and reading times.

The apparatus according to the present invention comprises a first divider for entering a low order clock signal synchronizing with the entered low order data signal for a single channel to divide the clock signal to 1/m (m: positive integer) in order to generate a writing clock signal, a second divider for entering a high order clock signal having a bit rate not lower than that of the low order clock signal for any channel to divide the high order clock signal to 1/m in order to generate a reading clock signal, an m-bit memory circuit into which the low order data signal is written by the writing clock signal generated by the first divider and from which the data signal is read out by the reading clock signal generated by the second divider to be emitted as a high order data signal, a clock signal control circuit for suppressing the high order clock signal entering the second divider through the clock signal control circuit when a clock control signal is given to the clock signal control circuit, first control means for comparing the positions of the writing and reading clock signals at intervals of m-bits when the high order data signal is read out from the memory circuit, and for resetting the first and second dividers at the head position of the next frame when the phase difference therebetween falls within predetermined k-bits ($k \leq m$), to place the writing and reading clock signals in a predetermined positional relationship and second control means for comparing the count values of the writing and reading clock signals at the time of the last bit of each frame to emit a clock control signal to the clock signal control circuit.

In consequence, since, according to the present invention, the phase difference between the writing and reading clock signals is initially set to within predetermined k-bits and, during the following operation, an offset between the timings at which the data signal is written and read out can be monitored at a minimum phase interval, it cannot happen that the reading catches up with or overtakes the writing.

According to a preferred embodiment of the present invention, the first control means comprises a phase comparator for monitoring the S-th ($S \leq m$) outputs of the first and second dividers to emit a reset instruction signal when the phase difference therebetween falls within k-bits and a reset signal generator for emitting a reset signal to the first and second demultipliers at the head position of the next frame in accordance with a separately entered frame signal when the reset instruction signal is entered for resetting. Further, the second control means comprises a first counter for counting the entered low order clock signals, a second counter for counting the high order clock signals emitted from the clock signal control circuit and a count comparator for comparing the count values emitted from each of the first and second counters when the frame signal is given, and for emitting the clock control signal to the clock signal control circuit when the difference between the count values exceeds one bit.

In addition, according to another embodiment of the present invention, the first and second control means are each arranged with software.

Further, the present invention includes a pulse stuffing method which allows a multiplexed output to be generated by adding a stuffing bit to the entered low order data signal to frame synchronize with a higher bit rate by use of the pulse stuffing apparatus of the invention.

The above and other objects, features and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

A specific embodiment of the pulse stuffing multiplexing apparatus according to the present invention is hereinafter described with reference to FIGS. 3 and 4.

Figure 3:
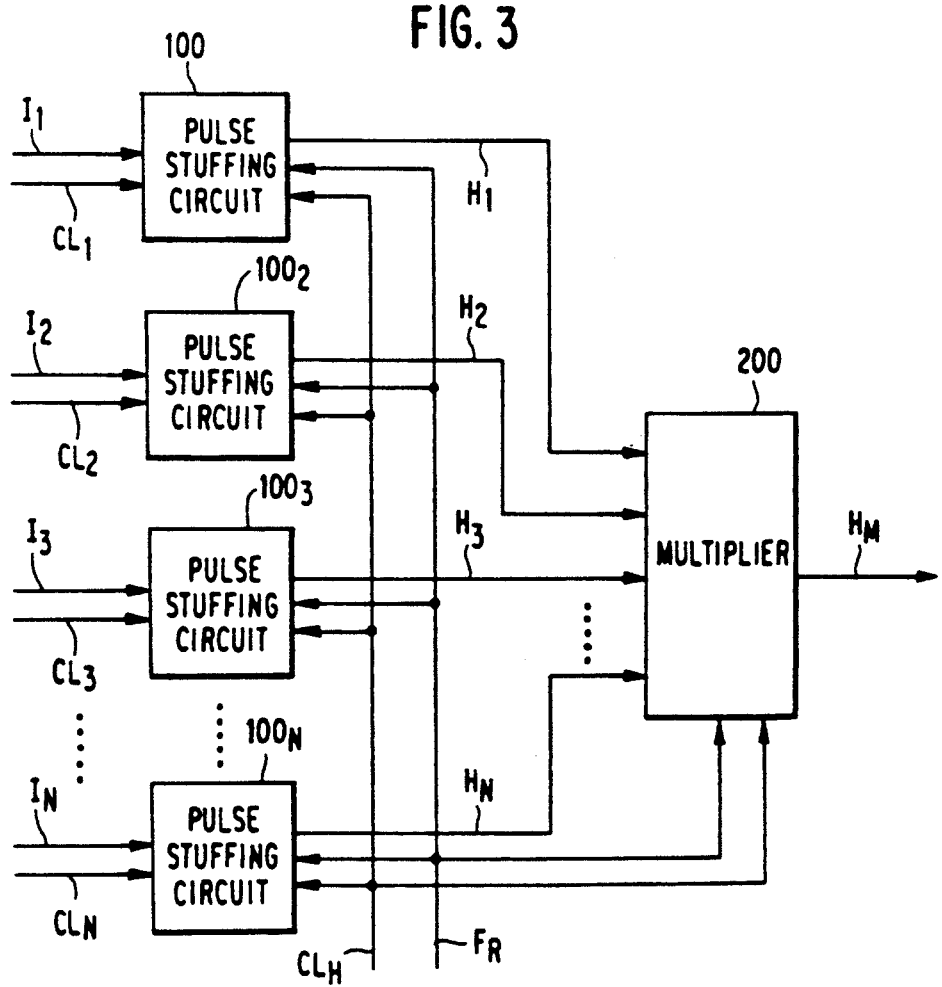
FIG. 3 is a view illustrating an example of the arrangement of a pulse stuffing multiplexing apparatus for low order data of N channels including the pulse stuffing circuit of the invention.
Figure 2:
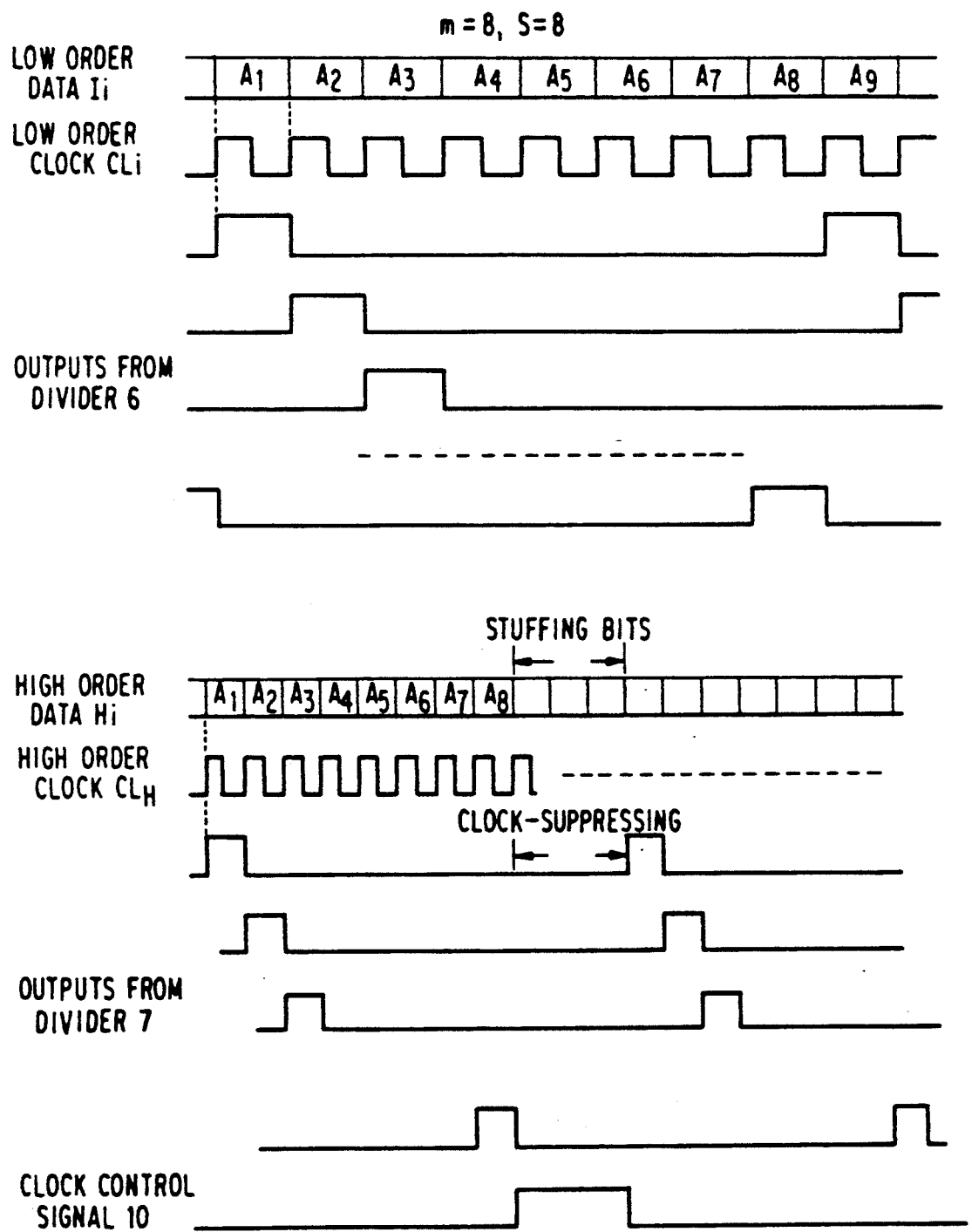
FIG. 2 is a view illustrating an example of a timing chart of each signal in the circuit of FIG. 1.
Figure 4:
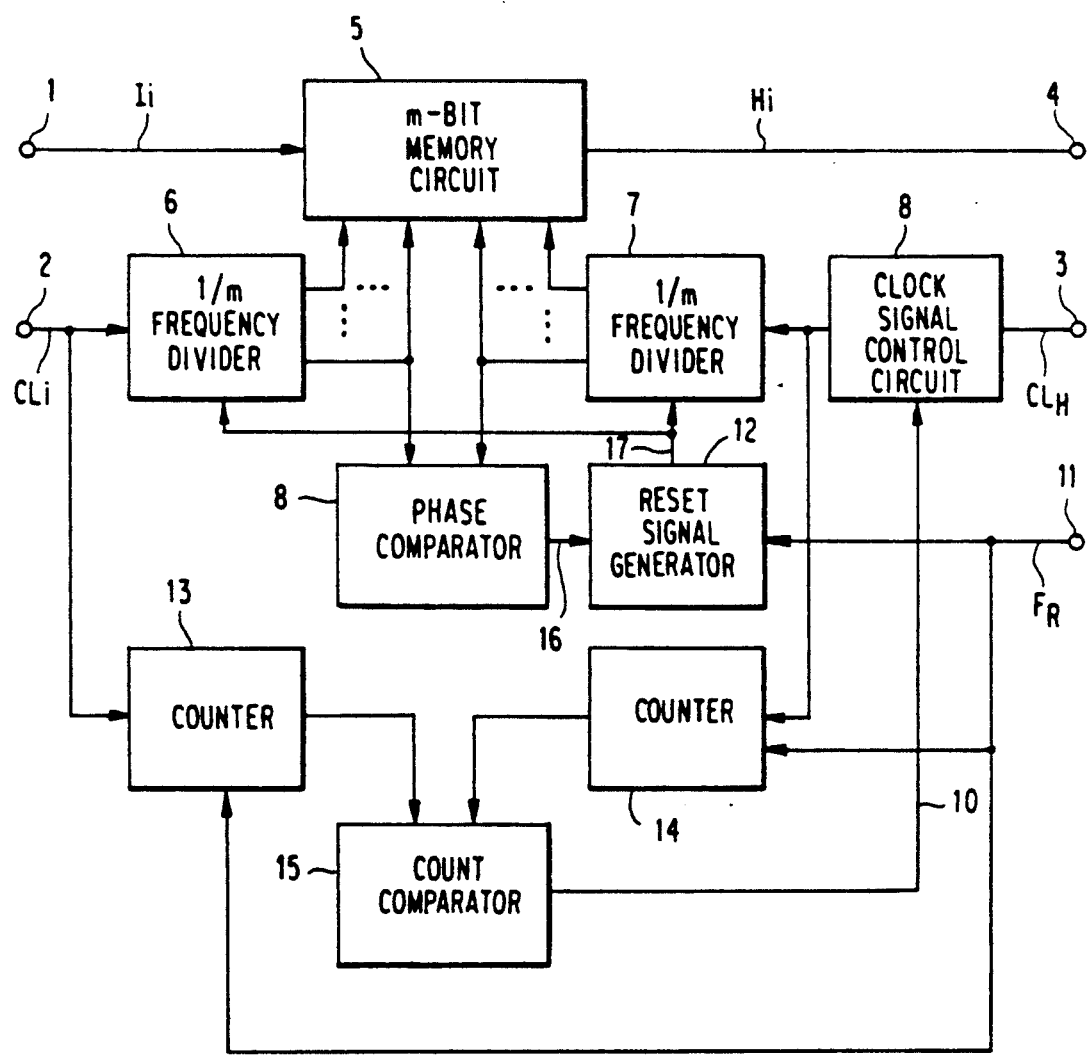
FIG. 4 is a block diagram illustrating the arrangement of the pulse stuffing circuit for a single channel in the apparatus of FIG. 3.

The pulse stuffing multiplexing apparatus of FIG. 3 is comprised of N (N: positive integer) number of pulse stuffing circuits for each to enter DS3 low order data signals $I_1$ through $I_N$ (frequency of 44.736 mb/s) from N number of channels and multiplexer 200. Each of low order data signals $I_1$ through $L_N$ is entered to pulse stuffing circuits $100_1$ through $100_N$ in synchronism with low order clock signals $CL_1$ through $CL_N$, respectively, and is stored there. In this case, low order clock signals $CL_1$ through $CL_N$ differ slightly from each other in frequency. Pulse stuffing circuits $100_1$ through $100_N$ read out the stored low frequency data signal based on high order clock signal $CL_H$ of frequency 51.84 mb/s defined at SONET and frame signal $F_R$ to generate high order clock signals $H_1$ through $H_N$, respectively. High order data signals $H_1$ through $H_N$ are each in synchronism with high order clock signal $CL_H$. Multiplexer 200 adds the stuffing bits and the frame signals to each of high order data signals $H_1$ through $H_N$ to carry out multiplex processing by using the high order clock signal of frequency ($51.84 \times N$) mb/s and emits high order multiplexed output signal $H_M$.

Figure 1:
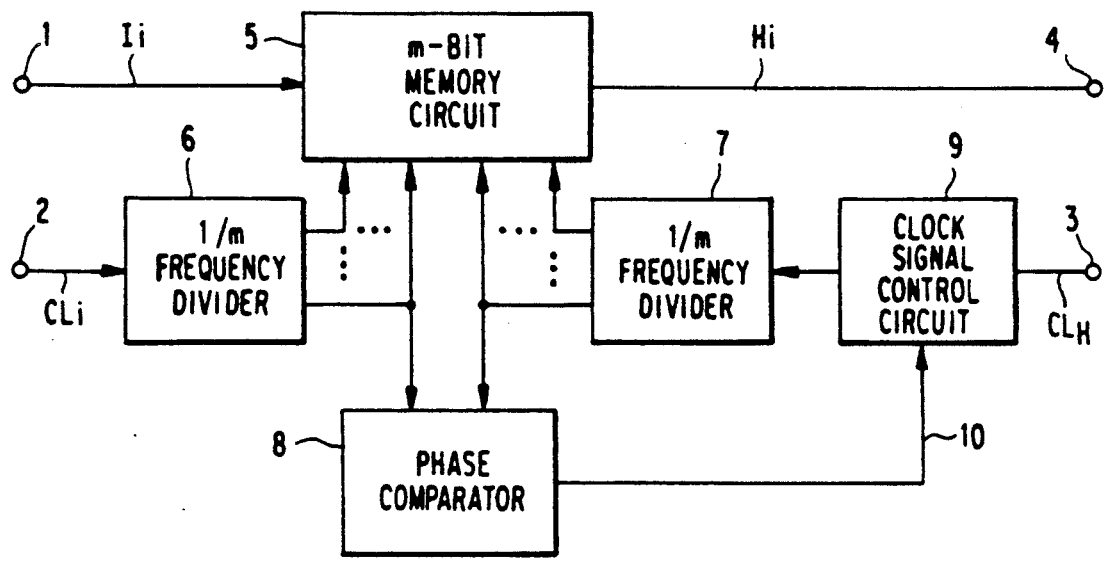
FIG. 1 is a block diagram illustrating an arrangement of a pulse stuffing circuit for a single channel in a conventional pulse stuffing apparatus.

All of pulse stuffing circuits $100_1$ through $100_N$ have the same arrangement. The arrangement of one of them is described with reference to FIG. 4. Pulse stuffing circuit $100i$ of the present invention has an arrangement in which reset signal generator 12, two counters 13 and 14 and counter/comparator 15 are added to the above conventional pulse stuffing circuit of FIG. 1.

Next, the operation of the present embodiment is hereinafter described. Here, as in the conventional technique, for the sake of simplifying the description, a case in which low order data signal $I_i$ is made synchronous with the frequency of high order clock signal $CL_H$ is described. Low order data signal $I_i$ is entered from terminal 1 to m-bit memory circuit 5 to be stored in it by using a writing clock signal obtained by dividing low order clock signal CLi entered from terminal 2 by 1/m frequency divider 6. This data signal is read out from m-bit memory circuit 5 by utilizing a reading clock signal obtained by 1/m frequency divider 7 which divides entered high order clock signal $CL_H$ to 1/m. The data is emitted from terminal 4 as high order data signal $H_i$. Phase comparator 8 monitors the divided outputs of the 1/m frequency dividers 6 and 7 at intervals of m bits and, when the phase difference therebetween falls within predetermined k bits ($k \leq m$), reset instruction signal 16 is emitted. When reset instruction signal 16 is entered, reset signal generator 12 emits reset signal 17 at the head position of the next frame in accordance with frame signal $F_R$ entered from terminal 11 to reset 1/m frequency dividers 6 and 7 to initialize so that the writing clock is positioned at a position where it is not overtaken by the reading clock.

In addition, in determining whether the stuffing bit is to be inserted or not, counters 13 and 14 count low order clock signal CLi and the clock signal from clock signal control circuit 9, respectively, and they repeat the counting each time they are reset by frame signal $F_R$. Count comparator 15 compares the counts of counters 13 and 14 when frame signal $F_R$ enters and, if the difference therebetween exceeds one bit, then clock control signal 10 is fed to clock signal control circuit 9, where high order clock signal $CL_H$ is suppressed in accordance with clock control signal 10 entered from count comparator 15. In consequence, corresponding to this vacant block, high order data signal $H_i$ read out from m-bit memory circuit 5 generates a vacant bit, and a stuffing bit is inserted at multiplexer circuit 200 (FIG. 3).

In accordance with the above operating procedure, each of high order data signals $H_i$ through $H_N$ emitted from pulse stuffing circuits $100_1$ through $100_N$ for all the channels is inserted with the appropriate number of the stuffing bits at multiplexer circuit 200 to be synchronized. Then, all of the high order data signals are multiplexed by utilizing the high order clock of ($CL_H \times N$) mb/s, and are added with frame bits to be emitted as multiplexed signal $H_M$.

By arranging the circuits as described above, the writing and the reading positions can always be monitored at the minimum phase intervals, which is equivalent to say that the writing and the reading clocks are compared in phase for each bit, which offers an advantage which can shorten the time interval taken for the steady state to be achieved.

Although a specific preferred embodiment of the present invention has been shown and described in detail, it should be understood that various changes and modifications may be made therein without departing from the scope and spirit of the appended claims.

What is claimed is:

1. A pulse stuffing circuit for each channel of a pulse stuffing multiplexer apparatus wherein low order data signals for N channels (N: positive integer) are entered and, after stuffing bits are added to the low order data signals in order to synchronize the bit rate of the entered low order data signals with a higher bit rate, these data signals are multiplexed to be emitted, comprising:

a first divider for entering a low order clock signal synchronizing with the entered low order data signal for a single channel to divide the clock signal to 1/m (m: positive integer) in order to generate a writing clock signal;

a second divider for entering a high order clock signal having a bit rate not lower than that of the low order clock signal for any channel to divide the higher order clock signal to 1/m in order to generate a reading clock signal;

an m-bit memory circuit into which said low order data signal is written by the writing clock signal generated by said first divider and from which said low order data signal is read out by the reading clock signal generated by said second divider to be emitted as the high order data signal;

a clock signal control circuit for suppressing the high order clock signal entering said second divider when a clock signal is given to the clock signal control circuit;

first control means for comparing the position of said writing clock signal and the position of said reading clock signal at intervals of m-bits when the high order signal is read out from said memory circuit, and for resetting said first and second dividers at the head position of the next frame when the interval therebetween falls within predetermined k-bits ($k \leq m$) to place said writing and reading clock signals in a predetermined positional relationship; and second control means for comparing the count values of said low order clock signal and said suppressed high order clock signal at the time of the last bit of each frame to emit said clock control signal to said clock signal control circuit.

2. A pulse stuffing circuit as set forth in claim 1 wherein said first control means comprises a phase comparator for monitoring the S-th ($S \leq m$) outputs of said first and second dividers to emit a rest instruction signal when the phase difference therebetween falls within said k-bits, and a rest signal generator for emitting a reset signal to said first and second dividers at the head position of the next frame in accordance with a separately entered frame signal when said reset instruction signal is entered for resetting.

3. A pulse stuffing circuit as set forth in claim 1 wherein said second control means comprises a first counter for counting said entered low order clock signal, a second counter for counting the high order clock signal emitted from said clock signal control circuit, and a count comparator for comparing the count values emitted from each of the first and second counters when said frame signal is given and for emitting said clock control signal to said clock signal control circuit when the difference between the count values exceeds one bit.

4. A pulse stuffing circuit as set forth in claim 2 or 3 wherein said frame signal is generated by a master clock or a network clock.

5. A pulse stuffing circuit as set forth in any of claims 1, 2 or 3 wherein said first and second control means are each arranged with software.

6. A pulse stuffing circuit as set forth in claim 2, wherein said second control means comprises a first counter for counting said entered low order clock signal, a second counter for counting the high order clock signal emitted from said clock signal control circuit, and a count comparator for comparing the count values emitted from each of the first and second counters when said frame signal is given and for emitting said clock control signal to said clock signal control circuit when the difference between the count values exceeds one bit.

7. A pulse stuffing method for adding stuffing bits to each of the low order data signals to cause the frame to synchronize the higher bit rate to conduct a pulse stuffing multiplexing operation on the low order data signals for N-channels comprising steps of:

dividing the low order clock signal bit synchronizing with the entered low order data signal for a single channel to 1/m to form a writing clock signal for a m-bit memory circuit;

entering a high order clock signal having a bit rate not lower than that of the low order clock signals of any channel to divide the high order clock signal to 1/m to form a reading clock signal for reading out the data from said memory circuit;

comparing the position of said writing clock signal and the position of said reading clock signal at intervals of m-bits when the data signal is read out from said memory circuit and resetting said first and second dividers at the head position of the next frame when the interval therebetween becomes no more than predetermined k-bits ($k \leq m$) to place said writing clock signal and said reading clock signal in a predetermined positional relationship; and comparing the count values of said low order clock signal and said high order clock signal by their last bit of each frame to suppress the entered high order clock signal when the difference therebetween exceeds one bit.

* * * * *

UNITED STATES PATENT AND TRADEMARK OFFICE
CERTIFICATE OF CORRECTION

PATENT NO. : 5,202,904
DATED : April 13, 1993
INVENTOR(S) : Yoshiki Kamada

It is certified that error appears in the above-indentified patent and that said Letters Patent is hereby corrected as shown below:

Column 1, line 38, delete "divides", and insert ---dividers---.
                                                    (second occurrence)

Column 5, line 30, after "when a clock", insert ---control---.
          line 50, delete "rest", and insert ---reset---.
          line 52, delete "rest", and insert ---reset---.

Signed and Sealed this

Twenty-ninth Day of March, 1994

Attest:

BRUCE LEHMAN

Attesting Officer      Commissioner of Patents and Trademarks